United States Patent
Hackett et al.

(10) Patent No.: US 9,026,931 B2
(45) Date of Patent: May 5, 2015

(54) CROSS-BROWSER "DRAG-AND-DROP" LIBRARY

(75) Inventors: Qinjia Liu Hackett, Bellevue, WA (US); Mary Sugino David, Seattle, WA (US); Zhenguang Chen, Sammamish, WA (US); Harsimrat Singh Thukral, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 605 days.

(21) Appl. No.: 13/303,134

(22) Filed: Nov. 22, 2011

(65) Prior Publication Data

US 2013/0132868 A1     May 23, 2013

(51) Int. Cl.
G06F 17/00     (2006.01)
G06F 3/0486     (2013.01)
G06F 17/30     (2006.01)

(52) U.S. Cl.
CPC ........ *G06F 3/0486* (2013.01); *G06F 17/30861* (2013.01); *G06F 17/3089* (2013.01); *G06F 17/30893* (2013.01)

(58) Field of Classification Search
CPC .............. G06F 3/0486; G06F 17/3089; G06F 17/30861
USPC .......................................... 715/769, 760, 230
See application file for complete search history.

(56) References Cited

U.S. PATENT DOCUMENTS

| | | | |
|---|---|---|---|
| 6,609,128 B1 | 8/2003 | Underwood | |
| 6,865,599 B2 | 3/2005 | Zhang | |
| 7,752,566 B1 * | 7/2010 | Nelson | 715/769 |
| 8,639,229 B2 * | 1/2014 | Apfel et al. | 455/416 |
| 2003/0107601 A1 * | 6/2003 | Ryzhov | 345/769 |
| 2007/0266384 A1 * | 11/2007 | Labrou et al. | 718/100 |
| 2010/0153453 A1 * | 6/2010 | Knowles | 707/784 |

OTHER PUBLICATIONS

Huisman, Brian., "Drag and Drop on a Shoestring", Retrieved at <<http://my.opera.com/GreyWyvern/blog/2008/03/27/drag-and-drop-on-a-shoestring>>, Mar. 27, 2008, pp. 7.

Zoltan., "Cross Browser HTML5 Drag and Drop", Retrieved at <<http://www.useragentman.com/blog/2010/01/10/cross-browser-html5-drag-and-drop/>>, Jan. 10, 2010, pp. 76.

(Continued)

*Primary Examiner* — Stephen Hong
*Assistant Examiner* — Matthew Ludwig
(74) *Attorney, Agent, or Firm* — Tom S Wong; Jim Ross; Micky Minhas

(57) ABSTRACT

Technologies are described herein for implementing a cross-browser drag-and-drop library. The drag-and-drop library creates a draggable object corresponding to a drag source element and a droppable object corresponding to a drop target element defined in a webpage. The draggable object and droppable object are each assigned a link key value. A user-defined data structure populated with data regarding the drag source element may also be assigned to the draggable object. A browser event indicating a drag-and-drop operation between the drag source and the drop target is intercepted, and the drag-and-drop library determines whether the link key value assigned to the corresponding draggable and droppable objects are the same. If the link key values are the same, the drag-and-drop library generates an event associated with the droppable object to facilitate an application-related operation associated with the drag-and-drop operation using the data in the user-defined data structure.

20 Claims, 4 Drawing Sheets

(56) References Cited

OTHER PUBLICATIONS

"Drag and Drop", Retrieved at <<http://ajaxpatterns.org/Drag-And-Drop>>, Retrieved Date: Jul. 21, 2011, pp. 5.

"Javascript drag&drop libraries review", Retrieved at <<http://www.ajaxpath.com/drag-and-drop/>>, Retrieved Date: Jul. 21, 2011, pp. 5.

Sharp, Remy., "Native Drag and Drop", Retrieved at <<http://html5doctor.com/native-drag-and-drop/>>, Jul. 9, 2009, pp. 16.

* cited by examiner

CROSS-BROWSER "DRAG-AND-DROP" LIBRARY

BACKGROUND

Drag-and-drop has become a popular mental model for moving items, such as moving documents from one location to another, in the user interface of a software application, such as that presented in a webpage inside a Web browser. As Web browsers and other Web technologies change and evolve, however, implementing a drag-and-drop experience that is cross-browser compatible may become difficult and involve multiple implementations to achieve a unified experience across browsers. In addition, while the HTML 5 standard provides drag-and-drop capabilities, the standard has been implemented differently in different browsers and browser versions, especially in the areas of event types, behaviors, and properties.

Developers may implement a separate drag-and-drop solution for each browser (and version) for which they desire drag-and-drop support, or they may utilize a number of drag-and-drop libraries that offer limited support for the drag-and-drop capabilities available on the target browser platforms. Existing drag-and-drop libraries lack the ability of defining links of drag sources and drop targets and allow multiple groups of drag sources and drop targets. In addition, the transfer of data between drag sources and drop targets is limited by the W3C standards and each browser's implementation such that developers have no way of specifying custom data to be transferred between the drag source and drop target.

It is with respect to these considerations and others that the disclosure made herein is presented.

SUMMARY

Technologies are described herein for implementing a cross-browser drag-and-drop library. Utilizing the technologies described herein, a drag-and-drop library may be provided that allows Web developers to easily and quickly include drag-and-drop functionality in their webpages without having to deal with the implementation details of drag-and-drop for different Web browsers and versions, saving implementation time and simplifying complexity, upgrading, and management of code. The drag-and-drop library further provides for the use of user-defined data structures to pass data between a drag source and a drop target, as well as facilities for grouping drag sources and targets together so that drag-and-drop operation are enabled between grouped pairs, with the user-defined data structure to be exchanged being defined at the group level.

According to embodiments, the drag-and-drop library may create a draggable object corresponding to a drag source element defined in a webpage and a droppable object corresponding to a drop target element defined in the webpage. The draggable object and droppable object are each assigned a link key value. In addition, a user-defined data structure populated with data regarding the drag source element may be assigned to the draggable object. The drag-and-drop library may intercept a browser event indicating that the drag source element was dropped onto the drop target element in the user interface defined by the webpage. Upon intercepting the browser event, the drag-and-drop library determines whether the link key value assigned to the draggable object and the link key value assigned to the droppable object are the same. If the link key values are the same, the drag-and-drop library generates an event associated with the droppable object that is configured to facilitate an application-related operation associated with the drag source element and/or drop target element using the data in the user-defined data structure.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for implementing a cross-browser drag-and-drop library. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
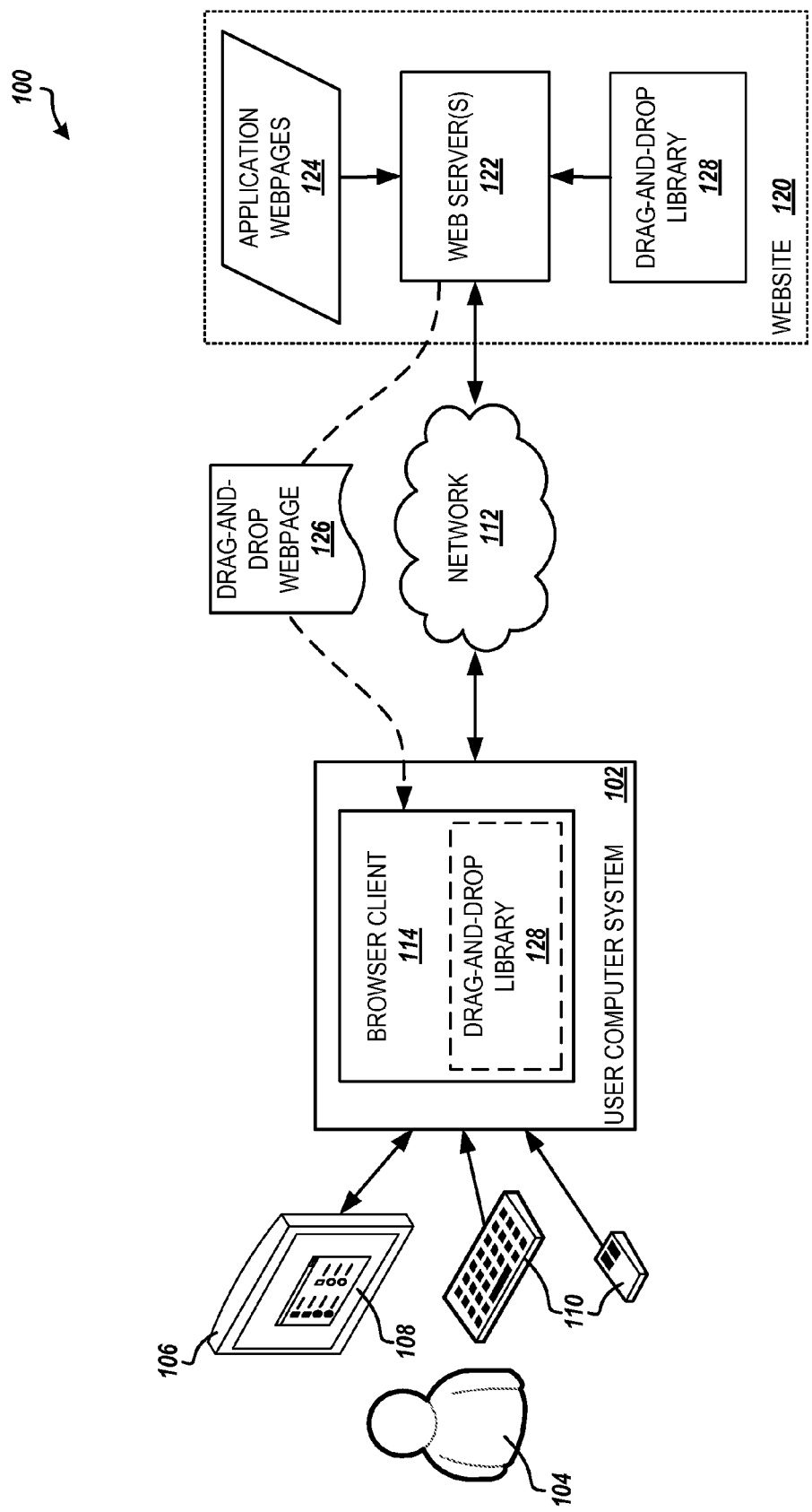
FIG. 1 is a block diagram showing aspects of an illustrative operating environment and software components provided by the embodiments presented herein.

FIG. 1 shows an illustrative operating environment 100 including software components for implementing a cross-browser drag-and-drop library, according to embodiments provided herein. The environment 100 includes a user computer system 102. The user computer system 102 may represent a user computing device, such as a personal computer ("PC"), a desktop workstation, a laptop, a notebook, a tablet, a mobile device, a personal digital assistant ("PDA"), a game console, a set-top box, a consumer electronics device, and the like. The user computer system 102 is accessed by a user 104 through a display device 106 that includes a touch-sensitive screen 108 and/or one or more traditional input devices 110, such as a keyboard, mouse, and the like, as shown in FIG. 1.

The user 104 may utilize the user computer system 102 to view and interact with webpages served by a website 120 across a network 112. The website 120 may comprise a number of Web servers 122 that serve application webpages 124 to a browser client 114 executing on the user computer system 102 in order to provide interactive application services to the user 104 across the network 112. It will be appreciated that the website 120 may further include application servers, database servers, and other server computers, network devices, and the like that are operably connected to the Web servers 122 in order to provide the interactive application services to the user 104. The network 112 may be a local-area network ("LAN"), a wide-area network ("WAN"), the Internet, or any other networking topology known in the art that connects the user computer system 102 to the website 120.

The browser client 114 allows the user 104 to view and interact with the application webpages 124 served by the website 120 across the network 112. In one embodiment, the browser client 114 may comprise a Web browser application, such as the MICROSOFT® INTERNET EXPLORER® Web browser from Microsoft Corp. of Redmond, Wash. In another embodiment, the browser client 114 may be an embedded component of the operating system ("OS") of the user computer system 102. The browser client 114 may exchange data with the Web server(s) 122 in the website 120 using the hypertext transfer protocol ("HTTP") over the network 112. Additionally or alternatively, the browser client 114 may utilize any number of communication methods known in the art to communicate with the website 120 and Web servers 122 across the network 112, including remote procedure calls, SOAP-based web services, remote file access, proprietary client-server architectures, and the like.

The application webpages 124 may include at least one user interface ("UI") comprising a drag-and-drop metaphor, as is known in the art, embodied in a drag-and-drop webpage 126. The drag-and-drop webpage 126 may be served by the Web servers 122 to the browser client 114, which presents the drag-and-drop metaphor UI to the user 104 on the display device 106 and provides for interaction with the UI by the user. The drag-and-drop webpage 126 may include hypertext markup language ("HTML"), extensible markup language ("XML"), JavaScript object notation ("JSON"), and the like that specify instructions regarding how the UI is to be rendered by the browser client 114 on the display device 106. According to embodiments, the drag-and-drop webpage 126 further includes script code, such as JavaScript, ECMAScript, JScript, VBScript, and the like, that specifies the parameters of the drag-and-drop UI and/or directs the interactions between the drag-and-drop UI and the user 104 of the user computer system 102.

According to embodiments, the browser client 114 further includes a drag-and-drop library 128. The drag-and-drop library 128 comprises computer-executable code that defines objects and application programming interfaces ("APIs") that allow the script code in the drag-and-drop webpage 126 to define the parameters and user interactions for the drag-and-drop UI embodied in the drag-and drop webpage 126. In one embodiment, the objects and/or APIs of the drag-and-drop library 128 may wrap existing objects and APIs offered by the browser client 114 in order to present a consistent interface to the script code in the drag-and-drop webpage 126 across different browser programs and versions, as well as to provide additional drag-and-drop features and functionality not natively supported by the browser client.

In one embodiment, the drag-and-drop library 128 may be served to the browser client 114 by the web server(s) 122 in the website 120 or by other web server(s) available across the network 112 upon the first access to the drag-and-drop webpage 126 by the browser client. For example, the drag-and-drop webpage 126 may include an HTML or XML tag or a script code instruction that instructs the browser client 114 to retrieve the drag-and-drop library 128 from the web server(s) 122 and to make the objects and APIs stored therein available to the script code in the drag-and-drop webpage. The browser client 114 may further store or "cache" the drag-and-drop library 128 on the user computer system 102 for subsequent use. In another embodiment, the drag-and-drop library 128 may be manually installed on the user computer system 102 by the user 104 and/or an administrator of the user computer system, as part of an application support package or runtime, for example.

Figure 2:
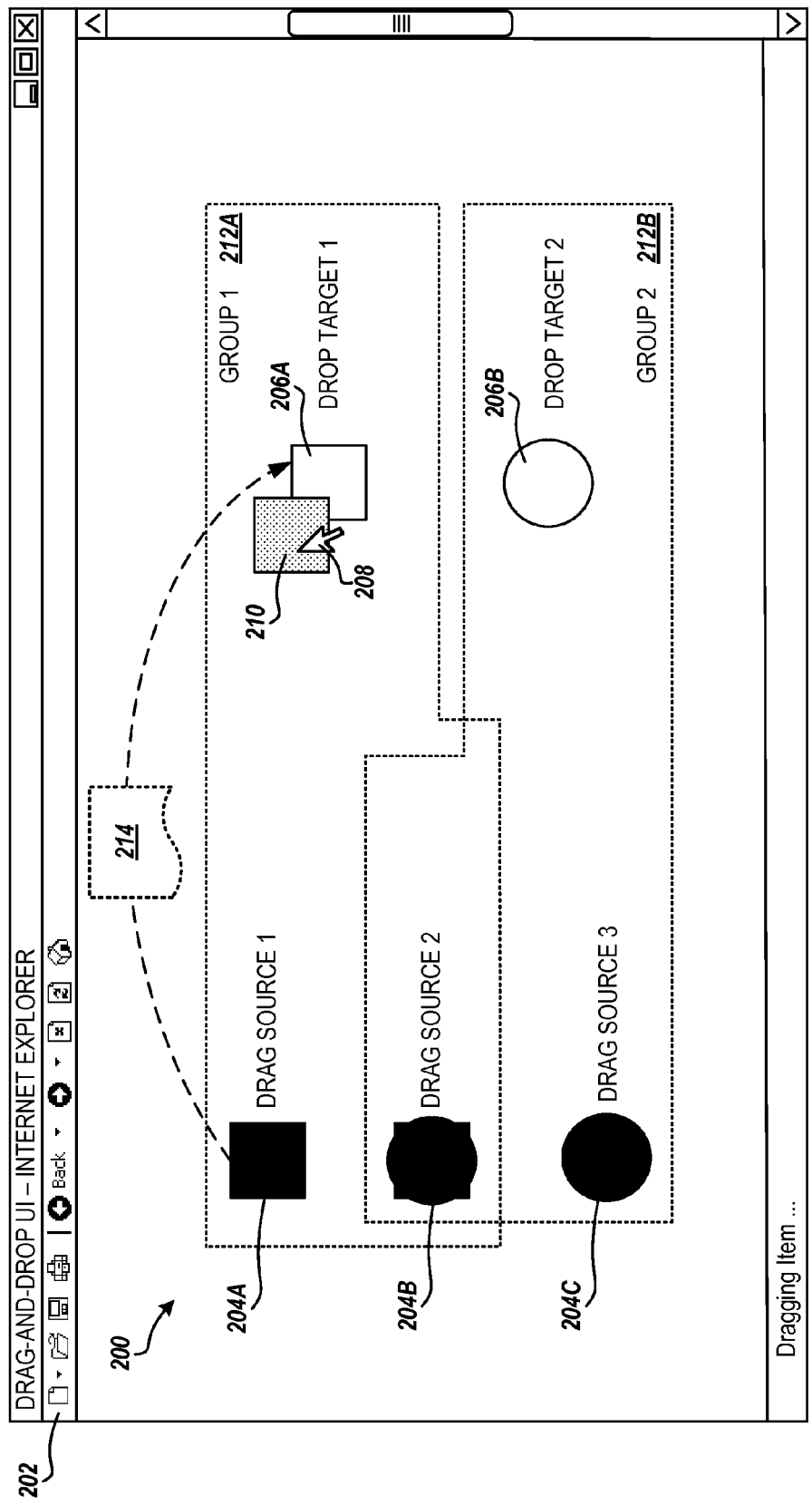
FIG. 2 is a screen diagram showing an illustrative user interface and aspects of implementing drag-and-drop functionality in a browser client, according to embodiments described herein.

FIG. 2 shows an illustrative drag-and-drop UI 200 defined in a drag-and-drop webpage 126 utilizing the drag-and-drop library 128. In one embodiment, the drag-and-drop UI 200 is rendered in a browser window 202 by the browser client 114. In other embodiments, the drag-and-drop UI 200 may be rendered in an app tile or pane provided by the OS of the user computer system 102, or it may be rendered in "full-screen" on the display device 106. The drag-and-drop UI 200 includes a number of drag sources 204A-204C (also referred to herein as drag source 204 and drag sources 204) and a number of drop targets 206A-206B (also referred to herein as drop target 206 and drop targets 206). As referred to herein, the drag sources 204 and drop targets 206 represent the visual elements in the drag-and-drop UI 200 along with their corresponding objects/elements in the document object model ("DOM") comprising the drag-and-drop webpage 126.

According to embodiments, the drag sources 204 may be "dragged" around the UI by the user 104, through use of a mouse pointer 208 controlled by a mouse, for example. The UI may display a symbolic representation 210 of the drag source 204 during the drag operation, as further shown in FIG. 2. The user 104 may further "drop" a drag source 204 on a drop target 206. For example, as shown in FIG. 2, the user 104 may drag the drag source 204A across the window 202 and drop it on the drop target 206A. This may cause the browser client 114 to execute an application-related operation associated with the drag source 204A and/or drop target 206A, either locally or by sending a request back to the Web servers 122, for example.

As described above, script code in the drag-and-drop webpage 126 may utilize the objects and APIs provided by the drag-and-drop library 128 to specify which elements of the drag-and-drop UI 200 are drag sources 204 and drop targets 206, as well as specify features and parameters of these objects and the application-related operations to perform upon the drop of a drag source on a drop target. According to one embodiment, the drag-and-drop library 128 provides one or more APIs that allow the script code to define groups 212A, 212B (also referred to herein as group 212 and groups 212) of drag sources 204 and drag targets 206. The groups 212 of drag sources 204 and drag targets 206 defined by the script code in the drag-and-drop webpage 126 may indicate to the drag-and-drop library 128 which drag sources 204 may be dropped onto which drop targets 206 through the drag-and-drop UI 200. The drag-and-drop library 128 and/or browser client 114 may then allow drag-and-drop operations to be performed between pairs of drag sources 204 and drop targets 206 within the same group 212, while ignoring drops, hover-over, and other interactions between drag sources and drop targets not grouped together.

In one embodiment, each drag source 204 and/or drop target 206 may belong to more than one group 212. For example, as shown in FIG. 2, drag sources 204A and 204B may be grouped with drop target 206A in a first group 212A, while drag sources 204B and 204C may be similarly grouped with drop target 206B in a second group 212B. In this example, the drag-and-drop library 128 and/or browser client 114 will facilitate a drag-and-drop operation between drag source 204A and drop target 206A, for example, but not between drag source 204A and drop target 206B. However, the drag-and-drop library 128 and/or browser client 114 may facilitate drag-and-drop operations between drag source 204B and both drop targets 206A and 206B.

According to another embodiment, the drag-and-drop library 128 further provides one or more APIs that allow the script code to define a user-defined data structure 214 to be exchanged between a drag source 204 and a drop target 206 upon the drag source being dropped on the drop target. The user-defined data structure 214 may be any data structure that allows context information regarding the drag source 204 and its representative element to be passed to the drop target 206 involved in the drag-and-drop operation. The context information from the user-defined data structure 214 regarding the drag source 204 may be utilized along with context information for the drop target 206 to execute the actual application-related operation resulting from the drag-and-drop operation.

The drag-and-drop library 128 may contain any number of objects and APIs defined based on any number of calling conventions or language structures. The objects and APIs of the drag-and-drop library 128 may be implemented in JavaScript, ECMAScript, .NET libraries, JAVA classes, or any other language/platform that can present APIs to the script code in the drag-and-drop webpage 126. In one embodiment, the drag-and-drop library 128 may define a SPDraggable object, which is based on a DOM element. The script code in the drag-and-drop webpage 126 may create a SPDraggable object from the DOM element corresponding to each drag source 204 in the drag-and-drop webpage 126. Options and event handlers can be supplied at creation of the object, or at a later time. Once the SPDraggable object is created, the script code may call the methods of the object to specify various options and parameters and/or to facilitate drag-and-drop operations for the corresponding drag source 204.

The drag-and-drop library 128 may add an "ms-draggable" cascading style sheet ("CSS") class to the DOM element corresponding to the drag source 204 indicating that it is a draggable element. Similarly the drag-and-drop library 128 may add an "ms-dragging" CSS class to the DOM element while the drag source 204 is being dragged by the user. These CSS classes may further determine the way the drag source 204 is rendered in the drag-and-drop UI 200 by the browser client 114 during the interaction of the user 104 with the UI. The drag-and-drop library 128 may further add a DragId attribute to the DOM element corresponding to the drag source 204 with a unique numeric identifier as the value.

The SPDraggable object may be defined with one or more of the methods shown in Table 1 below.

TABLE 1

Methods of SPDraggable object

| Name | Description |
| --- | --- |
| GetElement( ) | Returns the DOM element for this object. |
| GetLinkKeys( ) | Returns an array of LinkKeys for this object |
| AddLinkKey(/*@type(String)*/linkKey) | Add a LinkKey |
| RemoveLinkKey(/*@type(String)*/linkKey) | Remove a LinkKey |
| GetOption(/*@type(String)*/optionName) | Returns the value for an option |
| SetOption(/*@type(String)*/optionName, /*@dynamic*/value) | Set an Option |
| SetOptions(/*@Array*/options) | Set options provided in the array |
| Disable( ) | Disable this object |
| Enable( ) | Enable this object |
| Enabled( ) | Returns whether this object is disabled or enabled |
| Remove( ) | Remove this object and the draggable capability from the DOM element |

TABLE 1-continued

Methods of SPDraggable object

| Name | Description |
|---|---|
| AddEventListener(/*@type(String)*/eventType, /*@function*/listenerFunc) | Add an event listener. The eventType have to be one of the supported events. |
| SetData(/*@type(String)*/dataKey, /*@dynamic*/value) | Set and replace the data to be transferred for the given key. The dataKey should have the same value as the LinkKey |
| AddData(/*@type(String)*/key, /*@dynamic*/value) | Add to the data for the given key |
| GetData(/*@type(String)*/key) | Retrieve the data for the given key |
| ClearData(/*@type(String)*/key) | Remove data for the given key |
| GetDragImage( ) | Returns the dragging cursor image object |

The AddLinkKey method may be used to assign one or more link keys to the SPDraggable object corresponding to the drag source 204 in order to facilitate the grouping described above in regard to FIG. 2. According to embodiments, drag sources 204 and drop targets 206 assigned the same link key value are grouped together in a corresponding group 212. In addition, the SetData method may be used to assign a user-defined data structure 214 to the SPDraggable object corresponding to the drag source 204 that will be provided to any drop targets 206 on which the drag source is dropped.

The SetOption and SetOptions methods may be used to set one or more property values for the SPDraggable object and/or the corresponding DOM element of the drag source 204. Example options/properties that may be set are shown in Table 2 below. Event handlers for supported drag-and-drop events may be specified using the AddEventListener method shown in Table 1. The events supported by the SPDraggable object may include one or more of the events shown in Table 3 below. Each event handler function may receive an SPDragEvent parameter, which contains the original drag-and-drop event from the browser client 114, the SPDraggable object corresponding to the drag source 204 involved in the drag-and-drop event, and an SPDroppable object corresponding to the drop target 206 involved in the drag-and-drop event (if any), as will be described in more detail below.

TABLE 2

Options for SPDraggable object

| Name | Type | Default | Description |
|---|---|---|---|
| avoidClass | Boolean | true | Whether to avoid adding the 'SPDraggable' class when create the SPDraggable. Can be helpful for performance. |
| containment | element, string | false | Not Implemented yet. Constrains dragging to within the bounds of the specified element. Possible value: "parent", "document", "window" |
| cursor | String | 'auto' | The CSS cursor during the drag. |
| cursorAt | Object | false | Sets the offset of the dragging helper relative to the mouse cursor. {top, left, right, bottom} |
| delay | Integer | 0 | Time in milliseconds after mousedown until dragging should start. |
| distance | Integer | 1 | Distance in pixels after mousedown the mouse must move before dragging should start. |
| dragImage | String, Function | 'original' | Allows for a helper element to be used for dragging display. Possible values: 'original', 'clone', Function. If a function is specified, it must return a DOMElement. |

TABLE 3

Events supported by SPDraggable object

| Event Name | Description |
| --- | --- |
| spDragStart | When the drag start |
| spDrag | While dragging |
| spDragEnd | When the drag ended. |

The drag-and-drop library 128 may further define a SPDroppable object, which is also based on a DOM element. The script code in the drag-and-drop webpage 126 may create a SPDroppable object from the DOM element corresponding to each drop target 206 in the webpage. Once the SPDroppable object is created, the script code may call the methods of the object to specify various options and parameters and/or to facilitate drag-and-drop operations for the corresponding drop target 206. The SPDroppable object may be defined with one or more of the methods shown in Table 4 below.

TABLE 4

Methods of SPDroppable object

| Name | Description |
| --- | --- |
| GetElement( ) | Returns the DOM element for this object. |
| GetLinkKeys( ) | Returns an array of LinkKeys for this object |
| AddLinkKey(/*@type(String)*/ linkKey) | Add a LinkKey |
| RemoveLinkKey(/*@type(String)*/linkKey) | Remove a LinkKey |
| GetOption(/*@type(String)*/ optionName) | Returns the value for an option |
| SetOption(/*@type(String)*/optionName, /*@dynamic*/value) | Set an Option |
| SetOptions(/*@Array*/options) | Set options provided in the array |
| Disable( ) | Disable this object |
| Enable( ) | Enable this object |
| Enabled( ) | Returns whether this object is disabled or enabled |
| Remove( ) | Remove this object and the droppable capability from the DOM element |
| AddEventListener(/*@type(String)*/ eventType, /*@function*/listenerFunc) | Add an event listener. The eventType have to be one of the supported events. |

The AddLinkKey method may be used to assign one or more link keys to the SPDroppable object corresponding to the drop target 206. As discussed above, drag sources 204 and drop targets 206 assigned the same link key value are grouped together in a corresponding group 212. As in the SPDraggable object, the SetOption and SetOptions methods may be used to set one or more property values for the SPDroppable object and/or the corresponding DOM element of the drop target 206. Example options/properties that may be set are shown in Table 5 below. Event handlers for supported drag-and-drop events may be specified using the AddEventListener method shown in Table 4. The events supported by the SPDroppable object may include one or more of the events shown in Table 6 below. Each event handler function may receive a SPDragEvent parameter, as will be described in more detail below.

TABLE 5

Options for SPDroppable object

| Name | Type | Default | Description |
| --- | --- | --- | --- |
| activeClass | string | false | If specified, the class will be added to the droppable while an associated SPDraggable is being dragged |
| avoidClass | Boolean | false | Whether to avoid adding the 'ms-droppable' class when create the droppable. Can be helpful for performance. |
| bubble | boolean | false | If true, will continue event propagation on nested Droppables |
| hoverClass | String | false | If specified, the class will be added to the droppable while an associated SPDroppable is being hovered. |
| scope | String | 'default' | Used to group sets of draggable and droppable items, in addition to droppable's accept option. A draggable with the same scope value as a droppable will be accepted. |
| tolerance | String | 'intersect' | Specifies which mode to use for testing whether a draggable is 'over' a droppable. Possible values: 'fit', 'intersect', 'pointer', 'touch'.<br>fit: draggable overlaps the droppable entirely<br>intersect: draggable overlaps the droppable at least 50% |

TABLE 5-continued

Options for SPDroppable object

| Name | Type | Default | Description |
|------|------|---------|-------------|
| | | | pointer: mouse pointer overlaps the droppable<br>touch: draggable overlaps the droppable any amount |

TABLE 6

Events supported by SPDroppable object

| Event Name | Description |
|------------|-------------|
| spDragEnter | When the cursor enters the droppable element |
| spDragOver | While dragging over the droppable element |
| spDragLeave | When leaving the droppable element |
| spDrop | When the Drop happens. |

The drag-and-drop library 128 may also contain APIs that allows the script code in the drag-and-drop webpage 126 to create SPDraggable and/or a SPDroppable object for a DOM element, retrieve an existing SPDraggable or SPDroppable object for a DOM element, enable/disable drag-and-drop operations, and the like. These APIs may be embodied in a SPDragDropManager object defined by the drag-and-drop library 128. The methods of the SPDragDropManager object may be defined as shown in Table 7 below.

TABLE 7

Methods of SPDragDropManager object

| Name | Description |
|------|-------------|
| InitDraggable(element, [linkKeys], [options], [eventHandlers]) | Creates and initialize a SPDraggable object |
| InitDroppable(element, [linkKeys], [options], [eventHandlers]) | Creates and initialize a SPDroppable object |
| GetDraggable(element) | Get an existing SPDraggable object |
| GetDroppable(element) | Get an existing SPDroppable object |
| Disable( ) | Disable all drag drop operation |
| Enable( ) | Enable all drag drop operation |

The InitDraggable and InitDroppable methods specify the DOM element for the drag source 204 or drop target 206, respectively, along with the link keys for grouping the drag source 204 or drop target 206 into a group 212. These methods may also allow specification of option/property values for the elements and their behavior during drag-and-drop operations. The drag-and-drop library 128 may properly bind events, set CSS classes, store the specified option values, and return the corresponding SPDraggable or SPDroppable object when these methods are called. The GetDraggable and GetDroppable methods return an existing SPDraggable or SPDroppable object for the specified DOM element, if it exists. The Enable and Disable methods may enable/disable all drag-and-drop operations in the drag-and-drop UI 200.

As described above, each event handler function defined for an SPDraggable and SPDroppable object corresponding to a drag source 204 and drop targets 206 in the drag-and-drop UI 200 may receive an SPDragEvent object as a parameter, which contains the original drag-and-drop event from the browser client 114, the SPDraggable object corresponding to the drag source 204 involved in the drag-and-drop event, and the SPDroppable object corresponding to the drop target 206 involved in the drag-and-drop event. The properties and methods of the SPDragEvent object are provided below in Table 8.

TABLE 8

Properties and Methods of SPDragEvent object

| Member | Description |
|--------|-------------|
| Properties | |
| rawEvent | The browser event |
| Draggable | The SPDraggable object for this event |
| Droppable | The SPDroppable object for this event. |
| Methods | |
| SetData(/*@type(String)*/ dataKey, /*@dynamic*/data) | Set the data object for the event |
| GetData(/*@type(String)*/ dataKey) | Retrieve the data object. |
| ClearData(/*@String, @optional*/ dataKey) | Clear the data for the given dataKey |

According to further embodiments, the drag-and-drop library 128 takes care of cross-browser support of drag-and-drop operations in the drag-and-drop webpage 126. This may make enabling drag-and-drop operations in the webpage very straightforward for developers. For example, to enable drag-and-drop operations between the drag sources 204A-204C and drop targets 206A-206B in the drag-and-drop UI 200 shown in FIG. 2, script code may be added to the drag-and-drop webpage 126 to perform the following tasks. It will be appreciated that while the following script code examples are provided in JavaScript, other script languages may be used to enable drag-and-drop in a webpage through the drag-and-drop library 128, including ECMAScript, JScript, VBScript, and the like.

The first task may be to create custom string values to be used as link keys for the two groups 212A and 212B. As described above, the link key(s) assigned to SPDraggable and SPDroppable objects facilitate the grouping of the corresponding drag sources 204 and drop targets 206 into groups 212. The link keys may also be associated with the user-defined data structure 214 transferred from the drag source to the drop target in a drag-and-drop operation, as will be described in more detail below. The two link key values for the two groups 212A and 212B may be created as follows:

var g_dndSquareKey="SquareDragandDropGroup";
    var g_dndCircleKey="CircleDragandDropGroup";

Next, a SPDraggable object may be created for each drag source 204 in the drag-and-drop UI. For example, an SPDraggable object may be created from the DOM element for the drag source 204B belonging to both the first group 212A and the second group 212B with the following script code:

```
var linkKeys = { };
linkKeys[g__dndSquareKey] = "";
linkKeys[g__dndCircleKey] = "";
var /*@type(SPDraggable)*/draggable2 =
    SPDragDropManager.InitDraggable(DragSource2Element, linkKeys);
```

The options for each SPDraggable object may then be set using the methods described above in order to control the behaviors of the drag sources 204 in the drag-and-drop UI, such as the drag image that is displayed as the object moves along with the cursor during dragging, the distance between the drag image and the cursor, and the like.

In addition, event handlers for the SPDraggable objects may be specified, such as:

draggable2.AddEventListener("spDragStart", dndSourceItemDragStartHandler);

In the "spDragStart" event handler, the main task may be to retrieve the data that is useful for the drag-and-drop operation and create the user-defined data structure 214 and pass it to the event. The user-defined data structure 214 may be later retrieved at the drop event for use in the application-related operation associated with the drag-and-drop operation. For example, for the drag sources 204A-204C in the drag-and-drop UI 200 shown in FIG. 2 a user-defined data structure 214 to be passed from the drag source 204B to either drop target 206A or drop target 206B may be defined as:

```
ShapeDragData {
    /*@type(Integer)*/itemId ,
    /*@type(String)*/shapeType,
    /*@type(String)*/shapeData,
    /*@type(Boolean)*/replace,
    /*@type(String)*/statusText
    ...
};
```

The individual elements of the user-defined data structure 214 may be populated in the "spDragStart" event handler function for the drag source 204B and then set as the data structure for the corresponding link key(s) in the SPDraggable object:

```
function dndSourceItemDragStartHandler (/*@dynamic*/event)
{
    var /*@ShapeDragData*/dragData];
    // populate dragData with data corresponding to drag source 206B ...
    event.SetData(g__SquareKey, dragData);
    event.SetData(g__CircleKey, dragData);
}
```

It will be appreciated that different user-defined data structures 214 could be defined for each of the different link keys corresponding to the different groups 212 to which drag source 204B belongs. This may be the case where different data is needed for the drag-and-drop operation depending on which drop target 206A, 206B the drag source 204B is dropped.

In addition, a SPDroppable object may be created for each drop target 206 in the drag-and-drop UI. For example, an SPDroppable object may be created from the DOM element for the drop target 206A belonging to the first group 212A with the following script code:

```
var /*@type(SPDroppable)*/droppable1 =
    SPDragDropManager.InitDroppable(DropTarget1Element,
    g__dndSquareKey);
```

The options for each SPDroppable object may then be set using the methods described above in order to control the behaviors of the drop targets 206 in the drag-and-drop UI 200, such as the CSS styles for the drop target when dragging of an associated drag source 204 begins and/or a drag source is hovered over the drop target, and the like.

In addition, event handlers for the SPDraggable objects may be specified, such as:

droppable1.AddEventListener("dragEnter", dndSquareItemDragEnterHandler);
droppable1.AddEventListener("dragOver", dndSquareItemDragOverHandler);
droppable1.AddEventListener("drop", dndSquareItemDropHandler);

The "Drop" event handler may be where the corresponding application-related operation associated with the drag-and-drop operation is executed. The user-defined data structure 214 for the drag source 204 being dropped on the drop target 206 is retrieved, based on the common link key value, and the information contained therein along with context information for the drop target may be used to execute the application-related operation. For example, the "Drop" event handler for the drop target 206A described above may contain the following script code:

```
function dndSquareItemDropHandler (/*@dynamic*/event)
{
    var /*@dynamic*/dragData = event.GetData(g__SquareKey);
    // perform application operation with dragData and context
    information for square drop target
}
```

It will be appreciated that, for a drop target 206 belonging to multiple groups 212, the "Drop" event handler may search the link keys assigned to the corresponding SPDroppable object in order to determine which link key(s) the drag source 204 and the drop target have in common in order to retrieve the correct user-defined data structure 214 and execute the corresponding application-related operation.

Figure 3:
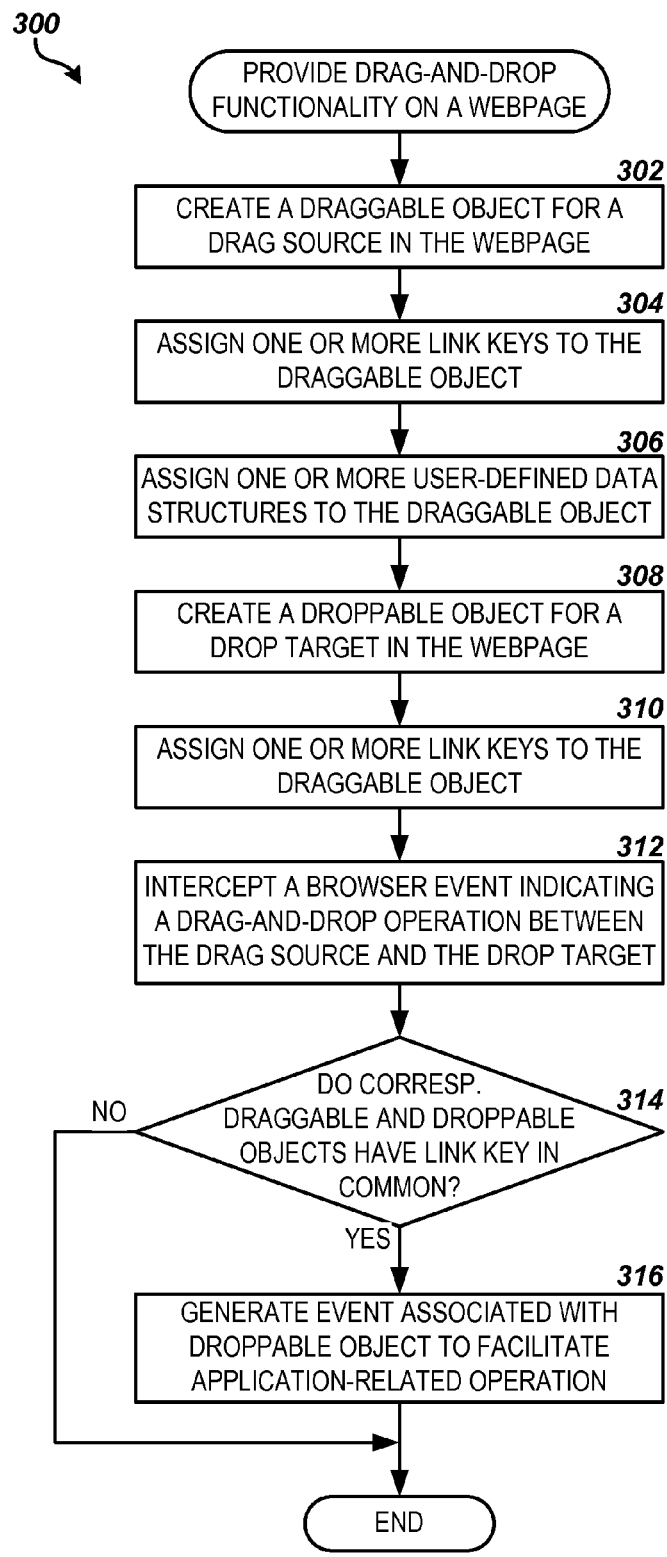
FIG. 3 is a flow diagram showing one method for providing drag-and-drop functionality in a browser client using a cross-browser drag-and-drop library, according to embodiments described herein.

Referring now to FIG. 3, additional details will be provided regarding the embodiments presented herein. It should be appreciated that the logical operations described with respect to FIG. 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein.

The operations may also be performed in a different order than described.

FIG. 3 illustrates one routine 300 for providing drag-and-drop functionality in a webpage using the drag-and-drop library 128, according to one embodiment. The routine 300 may be performed by the drag-and-drop library 128 loaded by the browser client 114 when rendering the drag-and-drop webpage 126 containing the drag-and-drop UI 200, for example. In addition, the operations of the drag-and-drop library 128 described herein may be triggered by one or more API calls made by script code contained in the drag-and-drop webpage 126. It will be appreciated that the routine 300 may also be performed by other modules or components executing on the user computer system 102, or by any combination of modules, components, and computing devices.

The routine 300 begins at operation 302, where the drag-and-drop library 128 creates a SPDraggable object corresponding to a drag source 204 in the drag-and-drop webpage 126. This may be performed in response to a call to the InitDraggable method of the SPDragDropManager object by the script code in the drag-and-drop webpage 126, for example. The call to the to the InitDraggable method may specify the DOM element for the drag source 204 in the drag-and-drop webpage 126, as shown in the example script code described above in regard to FIG. 2. In addition, various options/properties and event handler assignments may be specified for the SPDraggable object in the InitDraggable method call, or the SetOption, SetOptions, and/or AddEventListener methods of the SPDraggable object may be called from the script code after the object has been created to set the options and event handler assignments for the SPDraggable object and/or the corresponding DOM element of the drag source 204.

From operation 302, the routine 300 proceeds to operation 304, where the drag-and-drop library 128 assigns one or more link keys to the SPDraggable object corresponding to the drag source 204. As described above, the link key(s) assigned to SPDraggable and SPDroppable objects facilitate the grouping of the corresponding drag sources 204 and drop targets 206 into groups 212. The link keys may also be associated with the user-defined data structure 214 transferred from the drag source 204 to the drop target 206 in a drag-and-drop operation. As further shown in the example script code, the values for the link keys to be assigned to the SPDraggable object corresponding to the drag source 204 may be specified in the InitDraggable method that created the object. Alternatively or additionally, the AddLinkKey method of the SPDraggable object may be utilized to specify initial or additional link key values to be assigned to the object.

The routine 300 proceeds from operation 304 to operation 306 where the drag-and-drop library 128 further assign one or more user-defined data structures 214 populated with data regarding the drag source 204 to the corresponding SPDraggable object. As described above, the user-defined data structure 214 may be later retrieved at the drop event for use in the application-related operation associated with the drag-and-drop operation. According to one embodiment, the individual elements of the user-defined data structure 214 may be populated in the "Drag Start" event handler function for the SPDraggable object, then the data structure may be assigned to the SPDraggable object through the SetData method of the SPDragEvent object passed to the event handler function, as shown above in the example script code.

In another embodiment, the SetData method of the SPDraggable object may be utilized to assign the populated user-defined data structure 214 to the object. As further shown above in regard to FIG. 2, each user-defined data structure 214 assigned to the SPDraggable object may be further associated with a link key assigned to the object. The link key value associated with each user-defined data structure 214 may be specified in the SetData method calls assigning the data structure to the SPDraggable object, for example. It will be appreciated that different user-defined data structures 214 may be defined for each of the different link keys assigned to the SPDraggable object, or the same user-defined data structure may be associated with multiple link keys for the object.

From operation 306, the routine 300 proceeds to operation 308, where the drag-and-drop library 128 creates a SPDroppable object corresponding to a drop target 206 in the drag-and-drop webpage 126. This may be performed in response to a call to the InitDroppable method of the SPDragDropManager by the script code in the drag-and-drop webpage 126, for example. The call to the to the InitDraggable method may specify the DOM element for the drop target 206 in the drag-and-drop webpage 126, as shown in the example script code described above in regard to FIG. 2. In addition, various options/properties and event handler assignments may be specified for the SPDroppable object in the InitDroppable method call, or the SetOption, SetOptions, and/or AddEventListener methods of the SPDroppable object may be called after the object has been created to set the options and event handler assignments for the SPDroppable object and/or the corresponding DOM element of the drop target 206.

The routine 300 proceeds from operation 308 to operation 310, where the drag-and-drop library 128 assigns one or more link keys to the SPDroppable object corresponding to the drop target 206. As further shown in the example script code, the values for the link keys to be assigned to the SPDroppable object corresponding to the drop target 206 may be specified in the InitDraggable method that created the object, in the AddLinkKey method of the SPDroppable object, or through another API provided by the drag-and-drop library 128.

From operation 310, the routine 300 proceeds to operation 312, where the drag-and-drop library 128 intercepts an event from the browser client 114 indicating that the drag source 204 and/or the drop target 206 have been involved in a drag-and-drop operation. For example, when the SPDraggable and SPDroppable objects are created, the drag-and-drop library 128 may hook the browser events for the corresponding drag source 204 and drop target 206 DOM elements. If the drag source 204 is dropped on the drop target 206 through the drag-and-drop UI 200, the drag-and-drop library 128 will intercept the event generated by the browser client 114. The drag-and-drop library 128 may then evaluate the DOM elements implicated in the event as well as the properties, options, and event handlers defined for the corresponding SPDraggable and SPDroppable objects to determine how the event should be handled.

The routine 300 proceeds from operation 312 to operation 314, where the drag-and-drop library 128 determines if the SPDraggable and SPDroppable objects corresponding to the drag source 204 and the drop target 206, respectively, in the drag-and-drop operation have any assigned link keys in common. As described above, drag sources 204 and drop targets 206 assigned a common link key value are grouped together in a corresponding group 212. The drag-and-drop library 128 utilizes the groupings to determine if a drag-and-drop operation is supported between pairs of drag sources 204 and drop targets 206. If the SPDraggable and SPDroppable objects corresponding to the drag source 204 and the drop target 206 don't have a link key in common, the drag-and-drop library ignores the browser event and the routine 300 ends.

However, if the SPDraggable and SPDroppable objects corresponding to the drag source 204 and the drop target 206 do have a link key in common, the routine 300 proceeds from operation 314 to operation 316, where the drag-and-drop library 128 generates an event associated with the SPDroppable object to facilitate the application-related operation associated with the drag-and-drop operation. For example, as further shown in the sample script code, the drag-and-drop library 128 may call the "Drop" event handler function in the script code of the drag-and-drop web page 126 assigned to the SPDroppable object, passing a SPDragEvent object related to the event. The "Drop" event handler function may be where the application-related operation associated with the drag-and-drop operation is executed.

In addition, the drag-and-drop library 128 may make the user-defined data structure 214 assigned to the SPDraggable object corresponding to the drag source 204 available to the "Drop" event handler function in order to facilitate the application-related operation. For example, the "Drop" event handler function may utilize the GetData method of the SPDragEvent object or the SPDraggable object in order to retrieve the user-defined data structure 214, specifying the common link key value between the SPDraggable and SPDroppable objects associated with the user-defined data structure 214. From operation 316, the routine 300 ends.

Figure 4:
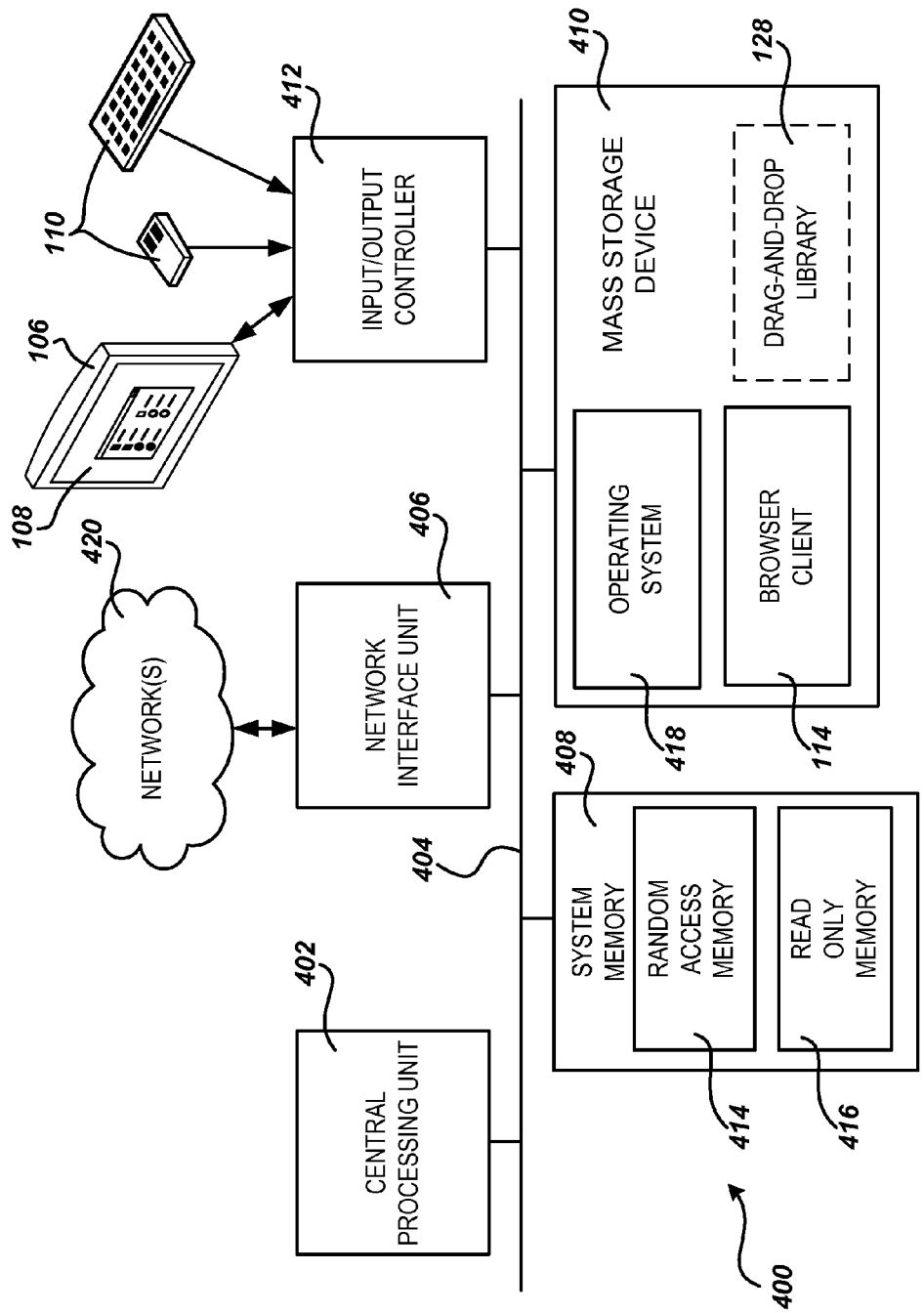
FIG. 4 is a block diagram showing an illustrative computer hardware and software architecture for a computing system capable of implementing aspects of the embodiments presented herein.

FIG. 4 shows an example computer architecture for a computer 400 capable of executing the software components described herein for implementing a cross-browser drag-and-drop library, in the manner presented above. The computer architecture shown in FIG. 4 illustrates a conventional desktop computer, laptop, notebook, PDA, wireless phone, server computer, or other computing device, and may be utilized to execute any aspects of the software components presented herein described as executing on the user computer system 102 or other computing device.

The computer architecture shown in FIG. 4 includes one or more central processing units ("CPUs") 402. The CPUs 402 may be standard processors that perform the arithmetic and logical operations necessary for the operation of the computer 400. The CPUs 402 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 408, including a random access memory ("RAM") 414 and a read-only memory 416 ("ROM"), and a system bus 404 that couples the memory to the CPUs 402. A basic input/output system containing the basic routines that help to transfer information between elements within the computer 400, such as during startup, is stored in the ROM 416. The computer 400 also includes a mass storage device 410 for storing an operating system 418, application programs, and other program modules, which are described in greater detail herein.

The mass storage device 410 is connected to the CPUs 402 through a mass storage controller (not shown) connected to the bus 404. The mass storage device 410 provides non-volatile storage for the computer 400. The computer 400 may store information on the mass storage device 410 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 400 may store information to the mass storage device 410 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 400 may further read information from the mass storage device 410 by detecting the physical states or characteristics of one or more particular locations within the mass storage device.

As mentioned briefly above, a number of program modules and data files may be stored in the mass storage device 410 and RAM 414 of the computer 400, including an operating system 418 suitable for controlling the operation of a computer. The mass storage device 410 and RAM 414 may also store one or more program modules. In particular, the mass storage device 410 and the RAM 414 may store the browser client 114 and/or the drag-and-drop library 128, both of which were described in detail above in regard to FIG. 1. The mass storage device 410 and the RAM 414 may also store other types of program modules or data.

In addition to the mass storage device 410 described above, the computer 400 may have access to other computer-readable media to store and retrieve information, such as program modules, data structures, or other data. It should be appreciated by those skilled in the art that computer-readable media may be any available media that can be accessed by the computer 400, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 400.

The computer-readable storage medium may be encoded with computer-executable instructions that, when loaded into the computer 400, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routine 300 for providing drag-and-drop functionality in a webpage using the drag-and-drop library 128, described above in regard to FIG. 3.

According to various embodiments, the computer 400 may operate in a networked environment using logical connections to remote computing devices and computer systems through one or more networks 420, such as a LAN, a WAN, the Internet, or a network of any topology known in the art. The computer 400 may connect to the network 420 through a network interface unit 406 connected to the bus 404. It should be appreciated that the network interface unit 406 may also be utilized to connect to other types of networks and remote computer systems.

The computer 400 may also include an input/output controller 412 for receiving and processing input from touch-sensitive screen 108 and/or one or more traditional input devices 110, including a keyboard, a mouse, a touchpad, an electronic stylus, or other type of input device. Similarly, the input/output controller 412 may provide output to a display device 106, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for implementing a cross-browser drag-and-drop library are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing drag-and-drop functionality in a user interface of a webpage, the method comprising:
receiving a first application programming interface ("API") call to create a first object, the first API call specifying a drag source element in the webpage and a first link key value; the first link key value being a string value for grouping of the drag source element with at least one drop target element;
creating the first object from the drag source element;
assigning the first link key value to the first object;
receiving a second API call associated with the first object and specifying a user-defined data structure populated with data regarding the drag source element;
assigning the user-defined data structure to the first object;
receiving a third API call to create a second object, the third API call specifying a drop target element in the webpage and a second link key value;
creating the second object from the drop target element;
assigning the second link key value to the second object;
intercepting a browser event indicating that the drag source element was dropped onto the drop target element in the user interface;
upon intercepting the browser event, determining that the first link key value assigned to the first object and the second link key value assigned to the second object are the same; and
upon determining that the first link key value and the second link key value are the same, generating an event associated with the second object configured to facilitate an application-related operation associated with one or more of the drag source element and the drop target element using the data in the user-defined data structure.

2. The computer-implemented method of claim 1, further comprising:
in response to generating the event associated with the second object, receiving a fourth API call to retrieve the user-defined data structure, the fourth API call associated with the first object; and
in response to receiving the fourth API call, returning the user-defined data structure assigned to the first object.

3. The computer-implemented method of claim 1, wherein the second API call further specifies the first link key value, and wherein assigning the user-defined data structure to the first object further comprises associating the user-defined data structure with the first link key value.

4. The computer-implemented method of claim 3, further comprising:
receiving a third link key value;
assigning the third link key value to the first object;

receiving a fifth API call associated with the first object and specifying a second user-defined data structure populated with data regarding the drag source element and the third link key value; and assigning the second user-defined data structure to the first object and associated with the third link key value.

5. The computer-implemented method of claim 4, further comprising:

receiving a sixth API call to retrieve a user-defined data structure assigned to the first object, the sixth API call associated with the first object and specifying the third link key value; and in response to receiving the sixth API call, returning the second user-defined data data structure assigned to the first object and associated with the third link key value.

6. The computer-implemented method of claim 1, further comprising:

intercepting a second browser event indicating that the drag source element was dropped onto a second drop target element in the user interface;

upon intercepting the second browser event, determining whether the first link key value assigned to the first object is the same as a link key value assigned to a third object corresponding to the second drop target; and upon determining that the first link key value is not the same as a link key value assigned to the third object, ignoring the second browser event.

7. The computer-implemented method of claim 1, wherein the first object and the second object are defined in a drag-and-drop library loaded by a browser client rendering the webpage, the drag-and-drop library further providing the first, second, and third APIs.

8. The computer-implemented method of claim 7, wherein the first, second, and third API calls are made to the drag-and-drop library by script code contained in the webpage.

9. The computer-implemented method of claim 8, wherein the drag-and-drop library is configured to provide a consistent set of APIs for the script code contained in the webpage across different browser platforms.

10. An optical disk, a magnetic storage device, or a solid state storage device comprising computer-executable instructions that, when executed by a computer, cause the computer to:

create a draggable object from a drag source element in a webpage;

assign a first link key value to the draggable object, the first link key value being a string value for grouping of the drag source element with at least one drop target element;

create a droppable object from a drop target element in the webpage;

assign a second link key value to the droppable object;

intercept a browser event indicating that the drag source element was dropped onto the drop target element through a user interface defined in the webpage;

upon intercepting the browser event, determining that the first link key value assigned to the draggable object and the second link key value assigned to the droppable object are the same;

upon determining that the first link key value and the second link key value are the same, generating an event associated with the droppable object configured to facilitate an application-related operation associated with one or more of the drag source element and the drop target element; and upon determining that the first link key value and the second link key value are not the same, ignoring the browser event.

11. The optical disk, magnetic storage device, or solid state storage device of claim 10, wherein the computer-executable instructions are contained within a drag-and-drop library loaded by a browser client rendering the webpage.

12. The optical disk, magnetic storage device, or solid state storage device of claim 11, wherein a plurality of link key values are assigned to a plurality of draggable objects and droppable objects, each of the plurality of link key values corresponding to a group comprising drag sources and drop targets defined in the webpage between which drag-and-drop operations are enabled by the drag-and-drop library.

13. The optical disk, magnetic storage device, or solid state storage device of claim 10, wherein a plurality of link key values are assigned to the draggable object.

14. The optical disk, magnetic storage device, or solid state storage device of claim 13, wherein a different user-defined data structure populated with data regarding the drag source element is assigned to the draggable object and associated with each of the plurality of link key values.

15. The optical disk, magnetic storage device, or solid state storage device of claim 10, comprising further computer-executable instructions that cause the computer to:

in response to generating the event associated with the droppable object, receive an application programming interface ("API") call to retrieve a user-defined data structure populated with data regarding the drag source element, the API call associated with the draggable object and specifying the first key value; and in response to receiving the API call, returning the user-defined data structure assigned to the draggable object and associated with the first key value.

16. A system for providing drag-and-drop functionality in a user interface of a webpage, the system comprising:

a computer;

a browser client executing on the computer and configured to render the user interface from the webpage; and a drag-and-drop library loaded by the browser client and configured to allow drag-and-drop operations between drag source elements and drop target elements defined in the webpage, the drag-and-drop library further configured to allow a user-defined data structure populated with data regarding a first drag source element to be assigned to a draggable object corresponding to the first drag source element, the user-defined data structure provided to a droppable object corresponding to a first drop target element when the first drag source element is dropped onto the first drop target element in a drag-and-drop operation in the user interface; and wherein at least one link key value is assigned to each of the drag source elements and the drop target elements defined in the webpage, and wherein a drag source element and a drop target element are assigned to the same group if the drag source element and the drop target element are assigned a same link key value.

17. The system of claim 16, wherein the drag-and-drop library is further configured to:
- create the draggable object defined in the drag-and-drop library from the first drag source element;
- assign the user-defined data structure to the draggable object;
- create the droppable object defined in the drag-and-drop library from the first drop target element;
- intercept an event in the browser client indicating that the first drag source element was dropped onto the first drop target element in the user interface; and
- upon intercepting the event in the browser client, generate an event associated with the droppable object configured to facilitate an application-related operation associated with one or more of the first drag source element and the first drop target element using the data in the user-defined data structure.

18. The system of claim 17, wherein the drag-and-drop library is further configured to:
- in response to generating the event associated with the droppable object, provide the user-defined data structure assigned to the draggable object to script code in the webpage performing the application-related operation.

19. The system of claim 16, wherein the drag-and-drop library is further configured to allow an assignment of one or more drag sources and one or more drop targets defined in the webpage to groups and to enable drag-and-drop operations only between a drag source and a drop target assigned to a same group.

20. The system of claim 16, wherein the at least one link key value is a string value for grouping of at least one drag source element with at least one drop target element defined in the webpage.

\* \* \* \* \*